United States Patent
Choi et al.

(10) Patent No.: US 9,075,471 B2
(45) Date of Patent: Jul. 7, 2015

(54) MOBILE TERMINAL AND CONTROLLING METHOD THEREOF

(71) Applicant: LG ELECTRONICS INC., Seoul (KR)

(72) Inventors: Hyundae Choi, Seoul (KR); Yeongkyu Lim, Seoul (KR); Youngho Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 13/896,051

(22) Filed: May 16, 2013

(65) Prior Publication Data

US 2014/0191983 A1    Jul. 10, 2014

(30) Foreign Application Priority Data

Jan. 4, 2013    (KR) .................. 10-2013-0000969

(51) Int. Cl.
*G06F 3/033* (2013.01)
*G06F 3/041* (2006.01)
*G06F 3/0482* (2013.01)
*G06F 3/0488* (2013.01)

(52) U.S. Cl.
CPC ........... *G06F 3/0412* (2013.01); *G06F 3/0482* (2013.01); *G06F 2203/04104* (2013.01); *G06F 3/04883* (2013.01); *G06F 3/04886* (2013.01)

(58) Field of Classification Search
USPC ........... 345/173, 174, 157; 715/781, 734, 735
See application file for complete search history.

(56) References Cited

U.S. PATENT DOCUMENTS

| | | | |
|---|---|---|---|
| 5,828,360 A * | 10/1998 | Anderson et al. | 715/834 |
| 6,958,749 B1 | 10/2005 | Matsushita et al. | |
| 2004/0155870 A1 * | 8/2004 | Middleton | 345/173 |
| 2005/0204305 A1 * | 9/2005 | Keely et al. | 715/781 |
| 2006/0001650 A1 | 1/2006 | Robbins et al. | |
| 2008/0143687 A1 * | 6/2008 | Nakasaka | 345/173 |
| 2009/0309849 A1 * | 12/2009 | Iwema et al. | 345/173 |
| 2010/0100849 A1 * | 4/2010 | Fram | 715/835 |
| 2011/0185300 A1 | 7/2011 | Hinckley et al. | |
| 2012/0212421 A1 | 8/2012 | Honji | |
| 2013/0194223 A1 * | 8/2013 | Ward et al. | 345/174 |
| 2013/0222238 A1 * | 8/2013 | Sliger | 345/157 |
| 2013/0285924 A1 * | 10/2013 | Griffin et al. | 345/173 |

FOREIGN PATENT DOCUMENTS

EP    1993029 A1    11/2008

* cited by examiner

*Primary Examiner* — Thuy Pardo
(74) *Attorney, Agent, or Firm* — Birch, Stewart, Kolasch & Birch, LLP

(57) ABSTRACT

A mobile terminal including a touchscreen configured to receive an input of a first touch gesture and a second touch gesture; a memory configured to store a discrimination value for determining if the first or second touch gesture is by a touch pen; and a controller configured to compare an attribute of the first touch gesture with the discrimination value, receive the first touch gesture as being from the touch pen when the attribute of the first touch gesture is within a predetermined value or range of the discrimination value, and execute an operation corresponding to the touch pen based on the first touch gesture being received as the touch pen.

17 Claims, 14 Drawing Sheets

(a)

(b)

(a)

(b)

MOBILE TERMINAL AND CONTROLLING METHOD THEREOF

Pursuant to 35 U.S.C. §119(a), this application claims the benefit of earlier filing date and right of priority to Korean Application No. 10-2013-0000969, filed on Jan. 4, 2013, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof.

2. Discussion of the Related Art

A mobile terminal can perform various functions, such as data and voice communications, capturing still images and video via a camera, recording audio, playing music files and outputting music via a speaker system, and displaying images and video on a display. Some terminals also support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals. The mobile terminals can be further classified into handheld terminals and vehicle mount terminals.

Recently, a smart phone includes a touchscreen such that the user can create a memo by drawing a desired pattern (e.g., diagram, character, numeral, etc.) on the touchscreen using a finger, a touch pen (e.g., a stylus pen, etc.) and the like. In this instance, the stylus pen may be categorized into an active type or a passive type.

As an active stylus pen can communicate with a mobile terminal, the mobile terminal can determine whether a touch gesture currently input to a touchscreen of the mobile terminal is attributed to the active stylus pen or a user's hand or finger. However, because a passive stylus pen cannot communicate with a mobile terminal, it is impossible for the mobile terminal to determine whether a touch gesture currently input to a touchscreen of the mobile terminal is attributed to the passive stylus pen or the user's hand or finger.

In particular, while the user is drawing a pattern of a numeral, a character, a diagram or the like on the touchscreen using the passive stylus pen, if the touchscreen is touched with the user's finger or palm, the mobile terminal cannot discriminate a touch with the passive stylus pen or a touch with the user's finger. Hence, the mobile terminal cannot recognize that a prescribed touch is actually input by the user for the purpose of the drawing. This eventually causes a problem that the user draws a pattern based on an unintended touch on the touchscreen.

SUMMARY OF THE INVENTION

Accordingly, embodiments of the present invention are directed to a mobile terminal and controlling method thereof that substantially obviate one or more problems due to limitations and disadvantages of the related art.

Another object of the present invention is to provide a mobile terminal and controlling method thereof, by which a touch attributed to a passive stylus pen and a touch attributed to a user's hand (e.g., finger, palm, etc.) can be discriminated from each other.

Yet another object of the present invention is to provide a mobile terminal and controlling method thereof, by which an operation corresponding to an actual user-intended touch attributed to a passive stylus pen can be discriminatively performed.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, the present invention provides a mobile terminal including a touchscreen configured to receive an input of a first touch gesture and a second touch gesture; a memory configured to store a discrimination value for determining if the first or second touch gesture is by a touch pen; and a controller configured to compare an attribute of the first touch gesture with the discrimination value, receive the first touch gesture as being from the touch pen when the attribute of the first touch gesture is within a predetermined value or range of the discrimination value, and execute an operation corresponding to the touch pen based on the first touch gesture being received as the touch pen.

In another aspect, the present invention provides a method of controlling a mobile terminal, and which includes receiving, via a touchscreen of the mobile terminal, an input of a first touch gesture and a second touch gesture; storing, via a memory of the mobile terminal, a discrimination value for determining if the first or second touch gesture is by a touch pen; comparing, via a controller of the mobile terminal, an attribute of the first touch gesture with the discrimination value; receiving, via the controller, the first touch gesture as being from the touch pen when the attribute of the first touch gesture is within a predetermined value or range of the discrimination value; and executing, via the controller, an operation corresponding to the touch pen based on the first touch gesture being received as the touch pen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, the present invention can also be applied to other types of terminals.

Figure 1:
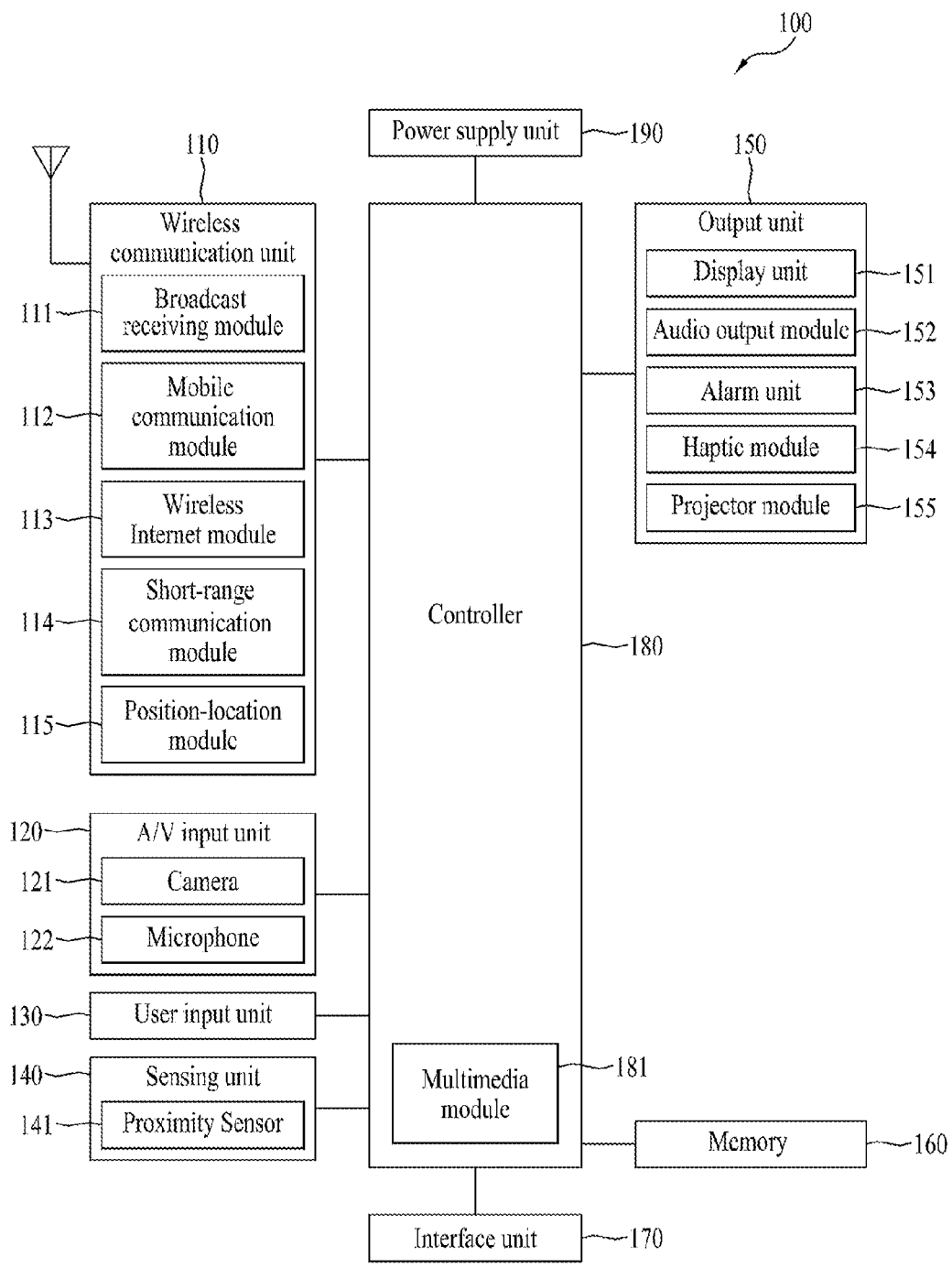
FIG. 1 illustrates a block diagram of a mobile terminal in accordance with one embodiment of the present invention.

FIG. 1 illustrates a block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. The mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. The wireless Internet technology can also be implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

Moreover, as mentioned in the foregoing description, the wireless internet module 113 can receive or download the data relevant to the area, in which the mobile terminal 100 is located, from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance.

The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
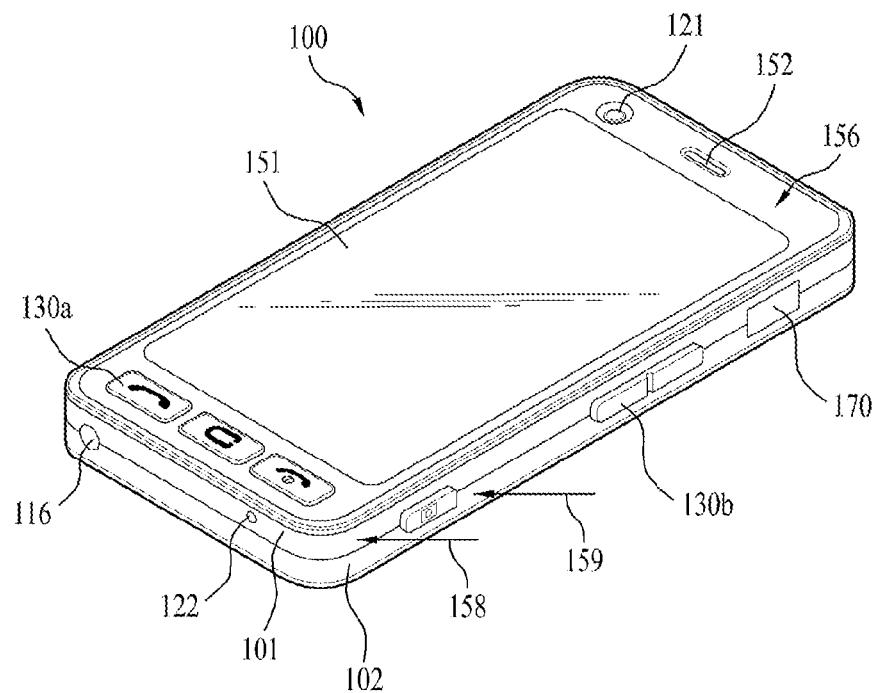
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body. However, the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130*a* and 130*b*, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130*a* and the microphone 122 can be located in proximity to another end of the display unit 151. As further shown in FIG. 2A, the user input module 130*b* and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130*a* and 130*b* shown in FIG. 2A. The user input modules 130*a* and 130*b* can each be referred to as a "manipulation unit" and can be configured to employ various methods and techniques of tactile manipulation and response to facilitate operation by the user.

The user input modules 130*a* and 130*b* can be configured for inputting different commands relative to one another. For example, the user input module 130*a* can be configured allow a user to input such commands as "start," "end," and "scroll" to the mobile terminal 100. The user input module 130*b* can allow a user to input a command for adjusting the volume of the audio output unit 152 or a command for switching to a touch recognition mode of the display unit 151.

Figure 2B:
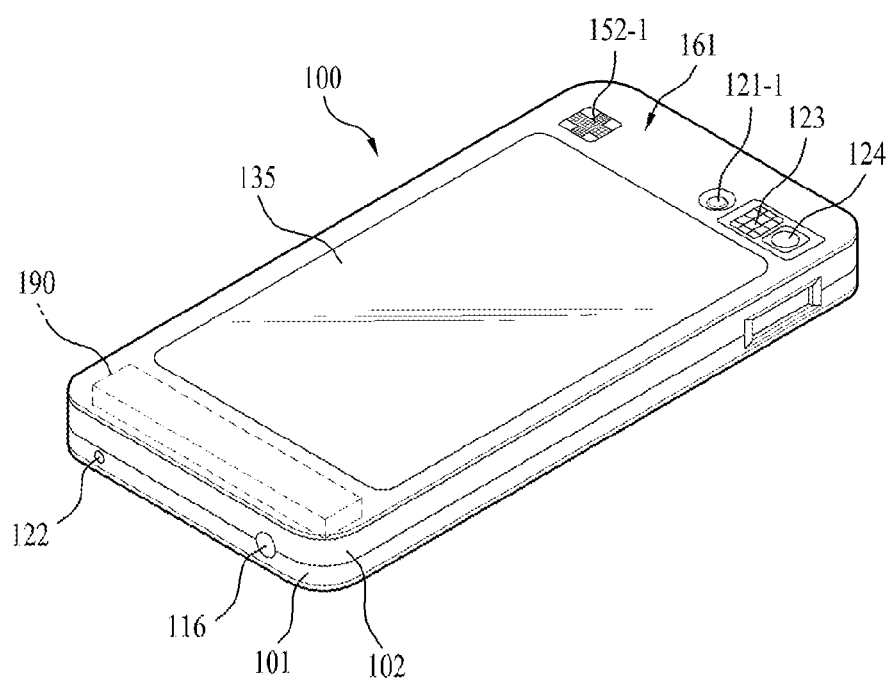
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, a method for performing an operation of a first touch gesture when inputting the first touch gesture by a touch pen and a second touch gesture by a user's hand (e.g., finger, palm, etc.) to a touchscreen, a process for displaying a pattern by the first touch gesture and editing the pattern by an editing scheme in accordance with the second touch gesture, and a process for activating a specific main function assigned to the first touch gesture and a sub-function, which belongs to the specific main function, assigned to the second touch gesture according to the present invention are explained in detail with reference to FIGS. 3 to 14.

In the following description, a touch pen of the present invention includes a passive stylus pen, a touch gesture input by the passive stylus pen is named a first touch gesture, and a touch gesture input by a user's hand (e.g., a finger, a palm, etc.) is named a second touch gesture. First of all, a process for discriminating first and second touch gestures input to the touchscreen 151 from each other is described in detail with reference to FIG. 3 as follows.

Figure 3:
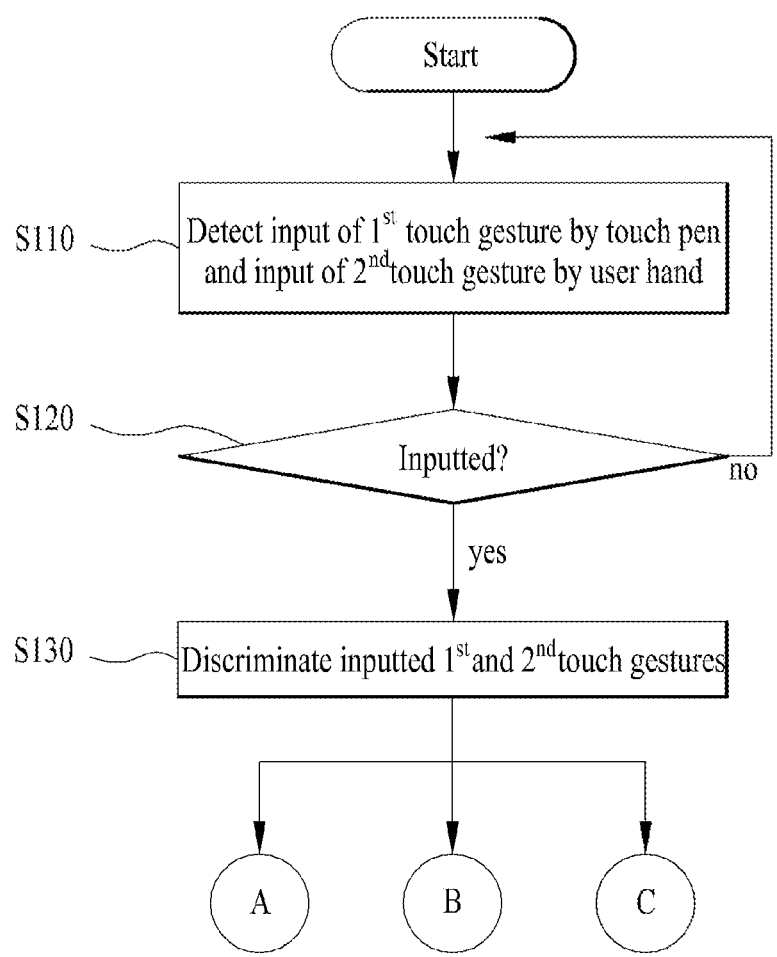
FIG. 3 is a flowchart of a method for discriminating a first touch gesture input to a touchscreen by a passive stylus pen and a second touch gesture input to the touchscreen by a user's hand (e.g., finger, palm, etc.)

FIG. 3 is a flowchart of a method for discriminating a first touch gesture input to a touchscreen by a passive stylus pen and a second touch gesture input to the touchscreen by a user's hand (e.g., finger, palm, etc.). Referring to FIG. 3, the controller 180 of the mobile terminal 100 detects whether a first touch gesture by a passive stylus pen or a second touch gesture by a user's hand (e.g., finger, palm, etc.) is input to the touchscreen 151 via the touchscreen 151 (S110).

Then, one active screen of functions executable in the mobile terminal 100 is displayed on the touchscreen 151. For example, if a user inputs a touch gesture pattern to write as a memo, a numeral, a character, a symbol, a diagram and the like to the screen via the passive stylus pen or the user's hand (e.g., finger, palm, etc.), an operation corresponding to the input touch gesture pattern is performed. Alternatively, the screen including the input touch gesture pattern can be captured and then saved as a memo in the memory 160.

For instance, the active screen of the function may include one of an active drawing board screen, a memo writing screen, an active screen of a file, a menu screen, an active screen of an application, an active screen of a widget, a broadcast play screen, a writing/display screen of SNS/SMS/MMS (social network service/short message service/multimedia message service), an email writing/display screen, a map screen, a web browser screen, a camera screen and the like.

Meanwhile, the first touch gesture and the second touch gesture may be simultaneously input onto the touchscreen 151. Alternatively, the first touch gesture and the second touch gesture may be contiguously input to the touchscreen 151 in random order. In particular, if the user touches the screen with the passive stylus pen while having his palm on the screen of the touchscreen 151, the second touch gesture is input and the first touch gesture is then input.

Moreover, while the user is drawing a pattern of the first touch gesture on the screen using the passive stylus pen, if the screen is touched with the palm or finger of the user, the first touch gesture is input and the second touch gesture is then input.

As mentioned in the above description, if the first touch gesture and the second touch gesture are input (S120), the controller 180 discriminates each of the input first and second touch gestures using a saved or configured discrimination value or may discriminate the first touch gesture only (S130). In this instance, the discrimination value is the value configured to discriminate the first touch gesture input by the passive stylus pen. In the following description, the discrimination value is explained.

First of all, the discrimination value may be at least one attribute value of a touch gesture input to the memory 160 by the passive stylus pen. For instance, a manufacturer of the mobile terminal 100 calculates each average value of attribute values of touch gestures input via a multitude of passive stylus pens used in the open market and can then save the calculated average value of each of the attribute values as the discrimination value in the memory 160.

In another instance, the controller 180 calculates an average value of each of attribute values of touch gestures previously input to the touchscreen 151 via a passive stylus pen and can then save the calculated average value of each of the attribute values as the discrimination value in the memory 160.

In particular, after a user has input a touch gesture pattern onto the touchscreen 151 at least one time via the passive stylus pen, if the user inputs a command for setting the input touch gesture patterns as the discrimination value, the controller 180 may control the average value of each of the attribute values of the input touch gesture patterns to be saved as the discrimination value in the memory 160.

Meanwhile, the attribute value may include an average range value of electrostatic strengths generated from the touch gestures input via the passive stylus pens. In this instance, the controller 180 recognizes the electrostatic strength of a first touch gesture input to the touchscreen 151 and the electrostatic strength of a second touch gesture input to the touchscreen 151, determines the touch gesture, which has the electrostatic strength belonging to the average range value, as the first touch gesture by the passive stylus pen, and also determines the touch gesture, which has the electrostatic strength not belonging to the average range value, as the second touch gesture by a user's hand (e.g., finger) (e.g., palm, finger, etc.).

In another example, the attribute value may include an average range value of touch areas of the touch gestures input via the passive stylus pens. In this instance, the controller 180 recognizes the touch area of a first touch gesture input to the touchscreen 151 and the touch area of a second touch gesture input to the touchscreen 151, determines the touch gesture, which has the touch area belonging to the average range value, as the first touch gesture by the passive stylus pen, and also determines the touch gesture, which has the touch area not belonging to the average range value, as the second touch gesture by a user's hand (e.g., finger) (e.g., palm, finger, etc.).

In still another example, the attribute value may include a difference value between the touch area of the first touch gesture and the touch area of the second touch gesture. In this instance, since the touch area of the first touch gesture input by the passive stylus pen is generally smaller than that of the second touch gesture input by a user's hand (e.g., finger), the controller 180 may determine the touch gesture, which has the smaller touch area, as the first touch gesture by the passive stylus pen and may also determine the touch gesture, which has the greater touch area, as the second touch gesture by a user's hand (e.g., finger) (e.g., palm, finger, etc.).

In yet another example, the attribute value may include a difference value between a touch gesture pattern change amount of the first touch gesture and a touch gesture pattern change amount of the second touch gesture. In this instance, the pattern change amount of the first touch gesture input by the passive stylus pen substantially corresponds to a drawing action of a user and is greater than that of the second touch gesture. Hence, the controller 180 recognizes the pattern change amount of the first touch gesture input to the touchscreen 151 and the pattern change amount of the second touch gesture input to the touchscreen 151, determines the touch gesture, which has the greater pattern change amount, as the first touch gesture by the passive stylus pen, and also determines the touch gesture, which has the smaller pattern change amount, as the second touch gesture by a user's hand (e.g., finger) (e.g., palm, finger, etc.).

In still a further example, the attribute value may include a difference value between a per-time moving distance of the first touch gesture and a per-time moving distance of the second touch gesture. In this instance, the per-time moving distance of the first touch gesture input by the passive stylus pen substantially corresponds to a drawing action of a user and is greater than that of the second touch gesture. Hence, the controller 180 determines the touch gesture, which has the greater per-time moving distance, as the first touch gesture by the passive stylus pen and also the controller 180 determines the touch gesture, which has the smaller per-time moving distance, as the second touch gesture by a user's hand (e.g., finger) (e.g., palm, finger, etc.).

Figure 4:
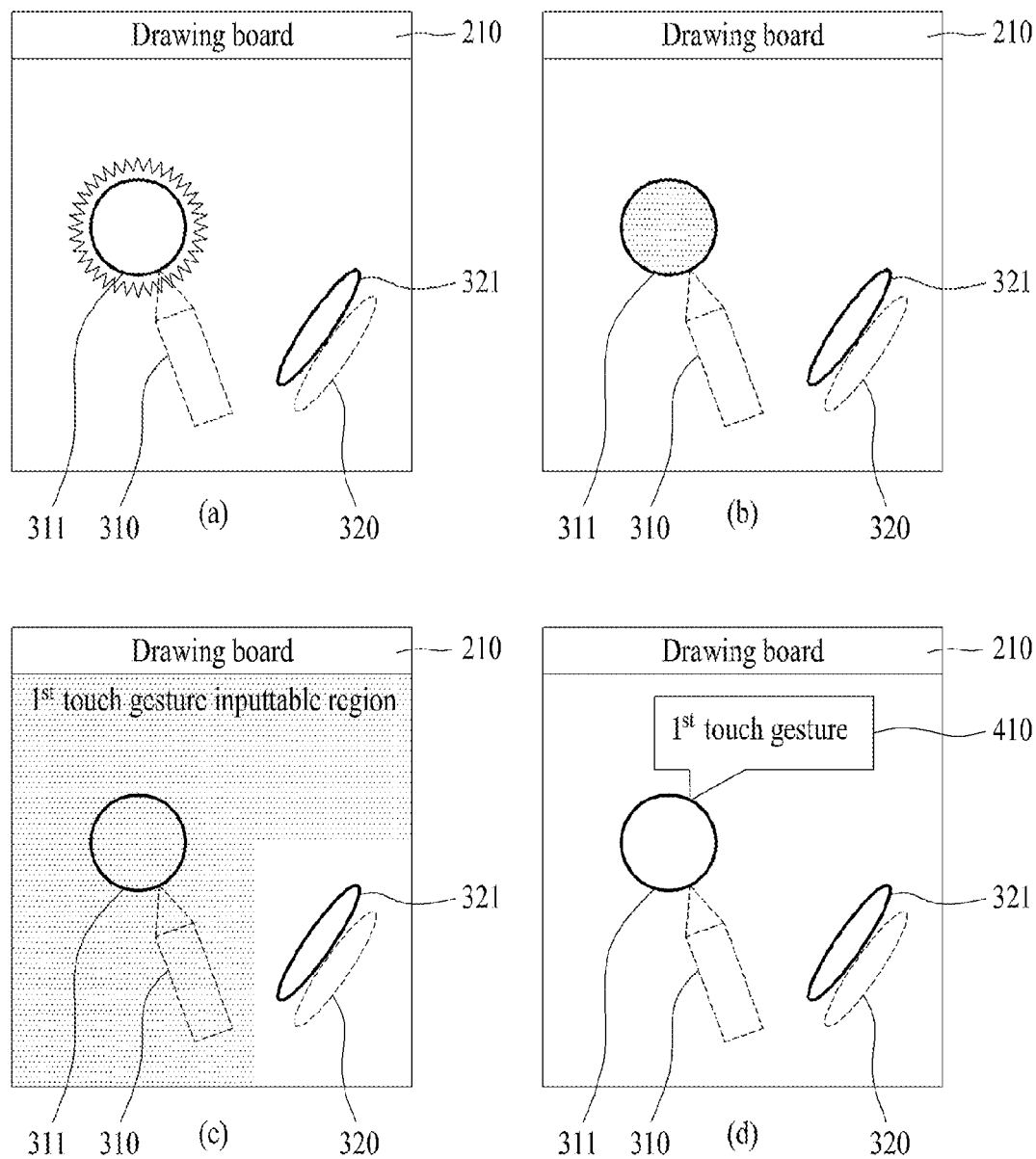
FIGS. 4 and 5 are diagrams to describe a process for identifiably displaying patterns of first and second touch gestures discriminated from each other according to the present invention.
Figure 5:
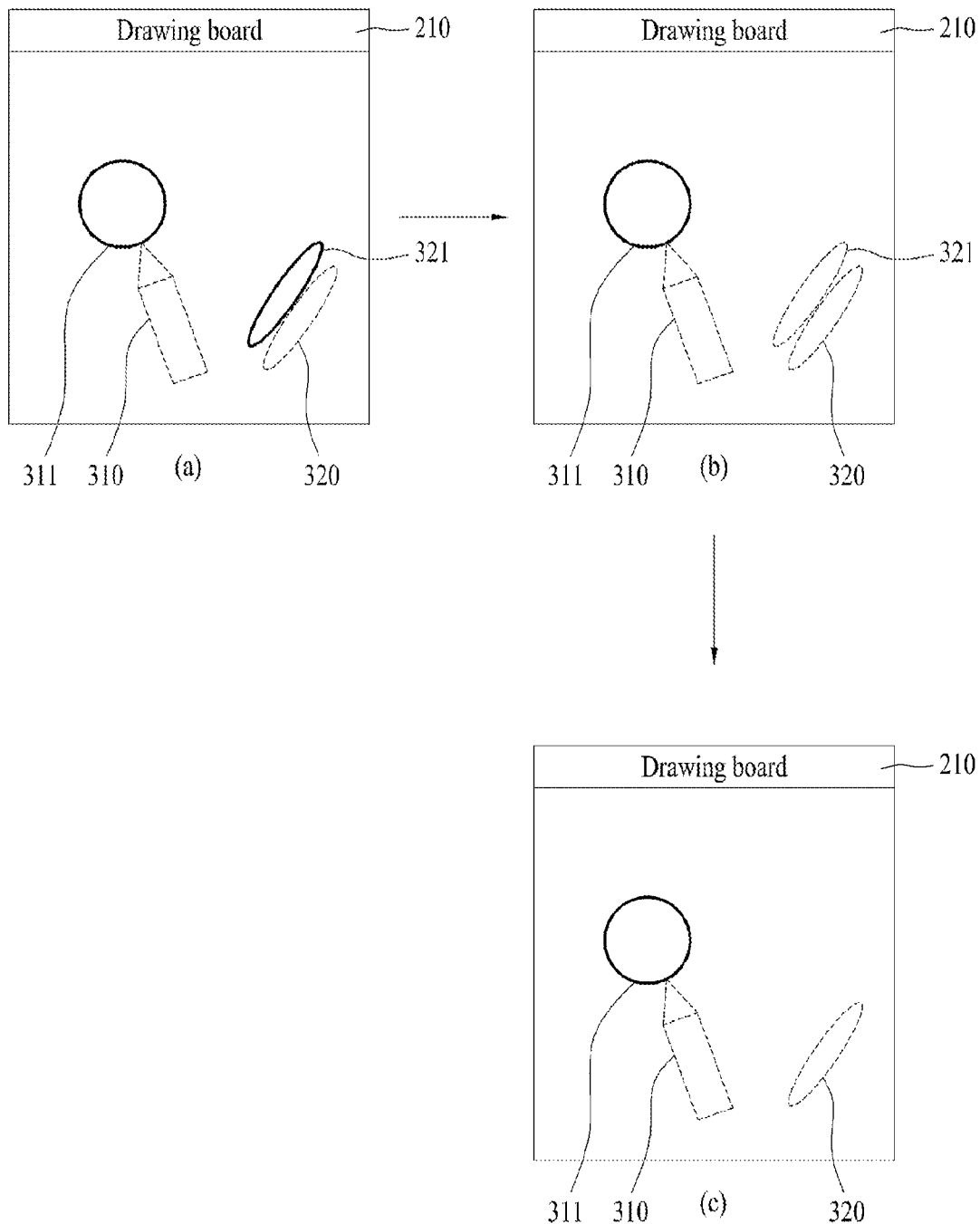

Next, FIGS. 4 and 5 are diagrams to describe a method for identifiably displaying patterns of first and second touch gestures discriminated from each other according to an embodiment of the present invention. According to the examples shown in FIG. 4 and FIG. 5, a drawing board screen 210 is displayed as a screen displayable on the touchscreen 151.

Of course, the screen displayable on the touchscreen 151 may include such a screen executable in the mobile terminal 100 as a memo writing screen, an active screen of a file, a menu screen, an active screen of an application, an active screen of a widget, a broadcast play screen, a writing/display screen of SNS/SMS/MMS (social network service/short message service/multimedia message service), an email writing/display screen, a map screen, a web browser screen, a camera screen and the like, instead of the drawing board screen 210.

Referring to FIG. 4(a), if a first touch gesture by a passive stylus pen 310 and a second touch gesture by a user's hand (e.g., a finger, a palm, etc.) 320 are discriminated from each other by the process shown in FIG. 3, the controller 180 controls a pattern 311 of the first touch gesture and a pattern 321 of the second touch gesture to be displayed on the drawing board screen 210 by blinking only the pattern 311 of the first touch gesture. Hence, the controller 180 can distinctly display the pattern 311 of the first touch gesture input by a user using the passive stylus pen 310.

Referring to FIG. 4(b), the controller controls a specific color to be displayed on a part (or a region) of the drawing board screen 210, to which the pattern 311 of the first touch gesture is input, thereby enabling the pattern 311 of the first touch gesture input by a user using the passive stylus pen 310 to be displayed in a manner of being correctly recognized in the mobile terminal 100.

Referring to FIG. 4(c), if the first touch gesture is discriminated, the controller 180 controls information, which indicates that the rest of the drawing board screen 210 except the part (or region) having the second touch gesture pattern 321 input thereto is a region available for an input by the passive stylus pen 310, to be displayed. For instance, the controller 180 controls a specific color to be displayed on the rest of the drawing board screen 210 except the part (or region) having the second touch gesture pattern 321 input thereto, thereby indicating that the specific color displayed region is the region available for an input by the passive stylus pen 310.

Referring to FIG. 4(d), if the first touch gesture and the second touch gesture are discriminated from each other, the controller 180 controls an indication window 410, which indicates that the pattern 311 corresponds to the first touch gesture by the passive stylus pen 310, to be displayed around the first touch gesture pattern 311 displayed on the drawing board screen 210. Further, the indication window 410 may include at least one of a popup window, a word balloon and the like.

Moreover, if the first touch gesture is discriminated, the controller 180 controls a cursor or pointer to be displayed at a point, which is touched with the passive stylus pen 310, within the drawing board screen 210, thereby enabling the user to identify the point touched with the passive stylus pen 310 from the drawing board screen 210.

Meanwhile, referring to FIG. 5(a), if the first touch gesture and the second touch gesture are discriminated from each other, the controller 180 controls the pattern 311 of the first touch gesture and the pattern 321 of the second touch gesture to be displayed on the drawing board screen 210.

Referring to FIGS. 5(b) and 5(c), each time a predetermined time expires, the controller 180 controls the second touch gesture pattern 321 to gradually disappear from the drawing board screen 210. In particular, the second touch gesture pattern 320 shown in FIG. 4 or 5 is an unnecessary pattern unintentionally generated by the user's hand (e.g., finger, palm, etc.) 320 while the user is inputting the first touch gesture pattern 311 using the passive stylus pen 310. Therefore, the first touch gesture pattern 311 is emphasized to be easily identified by the user or the second touch gesture pattern 321 is made to disappear gradually.

Thus, the first and second touch gestures input onto the touchscreen 151 are discriminated from each other based on the discrimination value by the process mentioned with reference to FIGS. 3 to 5. Thereafter, referring to FIGS. 6 to 14, the controller 180 may perform an operation of the first touch gesture only (e.g., the operation A shown in FIG. 3), may display a pattern by the first touch gesture and edit the pattern by an editing scheme according to the second touch gesture (e.g., the operation B shown in FIG. 3), or may execute a specific main function assigned to the first touch gesture and a sub-function, which belongs to the main function, assigned to the second touch gesture (e.g., the operation C shown in FIG. 3).

Figure 6:
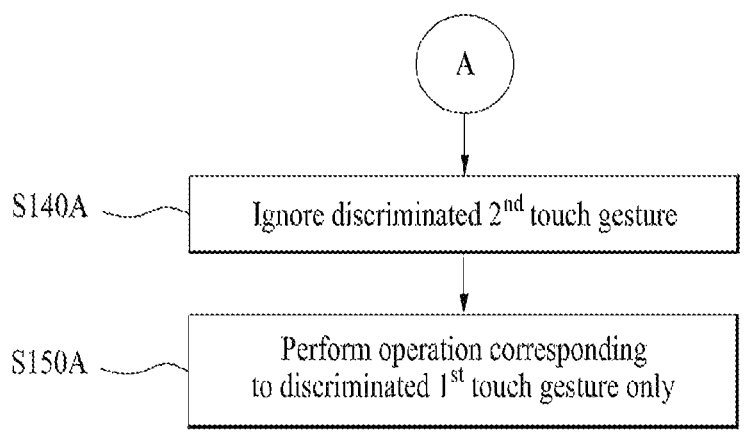
FIG. 6 is a flowchart of an operation A shown in FIG. 3.

Next, FIG. 6 is a flowchart of the operation A shown in FIG. 3. Referring to FIG. 6, if the first touch gesture and the second touch gesture are discriminated from each other based on the discrimination value by the process shown in FIG. 3, the controller 180 ignores the second touch gesture by the user's hand (e.g., finger, palm. etc.) 320 (S140A) and performs an operation corresponding to the first touch gesture input by the passive stylus pen 310 (S150A).

In particular, FIG. 6 shows a case that a touch input intended by the user is by the passive stylus pen 310. If the first and second touch gestures are discriminated from each other, the controller 180 does not perform the operation corresponding to the second touch gesture by the user's hand (e.g., finger, palm, etc.) 320, but only performs the operation corresponding to the first touch gesture by the passive stylus pen 310.

According to the description with reference to FIG. 6, if the user writes with the passive stylus pen 310 and touches their palm, for example, on the touchscreen 151, the controller 180 only recognizes the touch gesture by the passive stylus pen 310. Thus, while a screen including a multitude of function icons is displayed on the touchscreen 151, if the first touch gesture includes a touch corresponding to a selection of a specific one of the function icons, the controller 180 can execute a function assigned to the specific icon selected by the first touch gesture.

In this instance, a function related to the screen is assigned to the function icon. In addition, the screen may include a drawing board screen, a memo writing screen, a home screen, a standby screen, a menu screen, a broadcast screen, a video/music play screen, an application/widget active screen, a message writing/display screen, an email/writing/display screen, a map screen, a web browser screen, a camera screen and the like.

Moreover, if the first touch gesture has a pattern with a specific shape (e.g., numeral, character, symbol, diagram, etc.), the controller 180 controls the pattern of the first touch gesture to be displayed on the screen. If a preset function is assigned to the pattern of the first, the controller 180 executes the function assigned to the pattern of the first touch gesture.

Also, when the mobile terminal 100 is in a memo write mode, if a first touch gesture of a pattern corresponding to a memo content written by a user with the passive stylus pen 310 is input to the screen, the controller 180 controls the pattern of the input touch gesture to be displayed on the screen. Thereafter, if the user inputs a command for saving the first touch gesture pattern, the controller 180 may save the first touch gesture pattern corresponding to the user written memo content or an image of the screen including the first touch gesture pattern.

Figure 7:
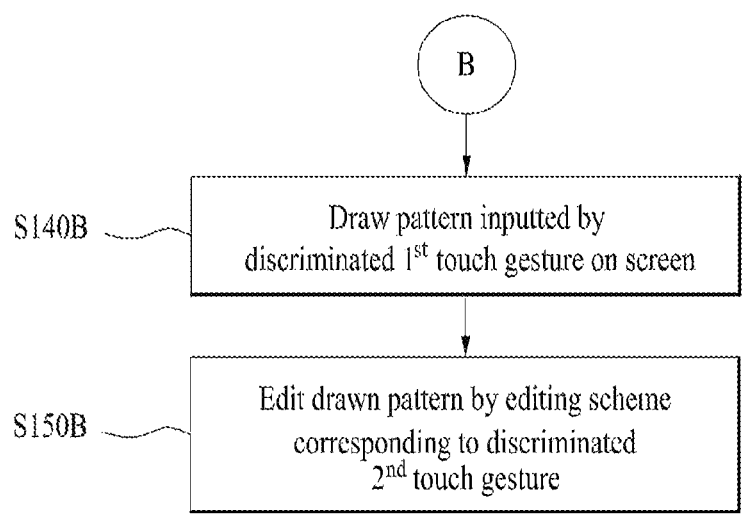
FIG. 7 is a flowchart of an operation B shown in FIG. 3.

In the following description, the operation B shown in FIG. 3 is explained in detail with reference to FIGS. 7 to 11. In particular, FIG. 7 is a flowchart of an operation B shown in FIG. 3, and FIGS. 8 to 11 are diagrams to describe the operation B shown in FIGS. 3 and 7.

Referring to FIGS. 7 to 11, if the first touch gesture and the second touch gesture are discriminated from each other based on the discrimination value by the process shown in FIG. 3, the controller 180 draws and displays a pattern of the first touch gesture on a screen of the touchscreen 151 (S140B).

Subsequently, the controller 180 edits the drawn pattern of the first touch gesture by an editing scheme assigned to the second touch gesture (S150B). In particular, in FIGS. 7 to 11, using the pattern of the second touch gesture input not by the passive stylus pen 310 but by the user's hand (e.g., finger, palm, etc.) 320, the user can edit the pattern drawn by the passive stylus pen 310.

In this instance, the editing scheme assigned to the second touch gesture may include all editing schemes related to the pattern drawing of the first touch gesture. For instance, the editing scheme may include size adjustment, color change, thickness change, cutting, copy, delete, move, rotation and the like.

Figure 8:
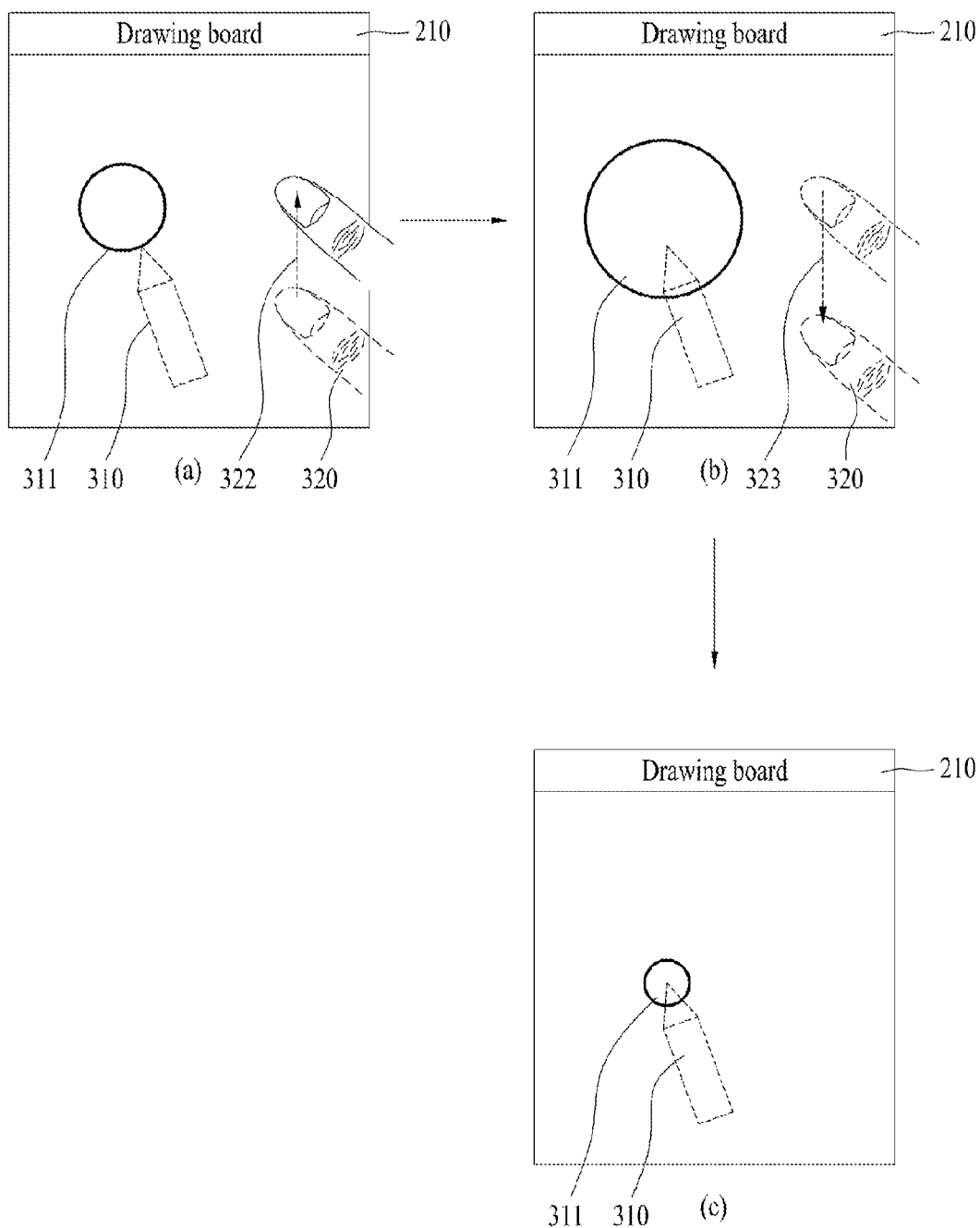
FIGS. 8 to 11 are diagrams to describe the operation B shown in FIG. 3.

In more detail, FIG. 8 shows a size adjustment editing function for the pattern of the first touch gesture assigned to the second touch gesture. Referring to FIG. 8(*a*), if the first touch gesture and the second touch gesture are discriminated from each other by the process shown in FIG. 3, the controller 180 draws and displays the pattern 311 of the first touch gesture on the drawing board screen 210.

If a pattern of the second touch gesture is a touch and drag having a first pattern 322, referring to FIG. 8(*a*), the controller 180 enlarges a size of the pattern 311 as shown in FIG. 8(*b*). While the pattern 311 of the first touch gesture is enlarged, if the first pattern 322 of the second touch gesture is changed into a second pattern 323 as shown in FIG. 8(*b*) (e.g., a touch and drag having a second direction opposite the first direction), the controller 180 reduces a size of the enlarged pattern 311 as shown in FIG. 8(*c*).

In particular, while the pattern 311 of the first touch gesture is drawn on the drawing board screen 210, if the pattern 322 is input by being dragged in a top direction by a user's hand (e.g., finger in FIG. 8) 320, the controller 180 enlarges the pattern 311 in proportion to an extent of the top-directional drag. On the other hand, if the pattern 323 is input by being dragged in bottom direction by the user's hand (e.g., finger in FIG. 8) 320, the controller 180 reduces the pattern 311 of the first touch gesture in proportion to an extent of the bottom-directional drag.

Figure 9:
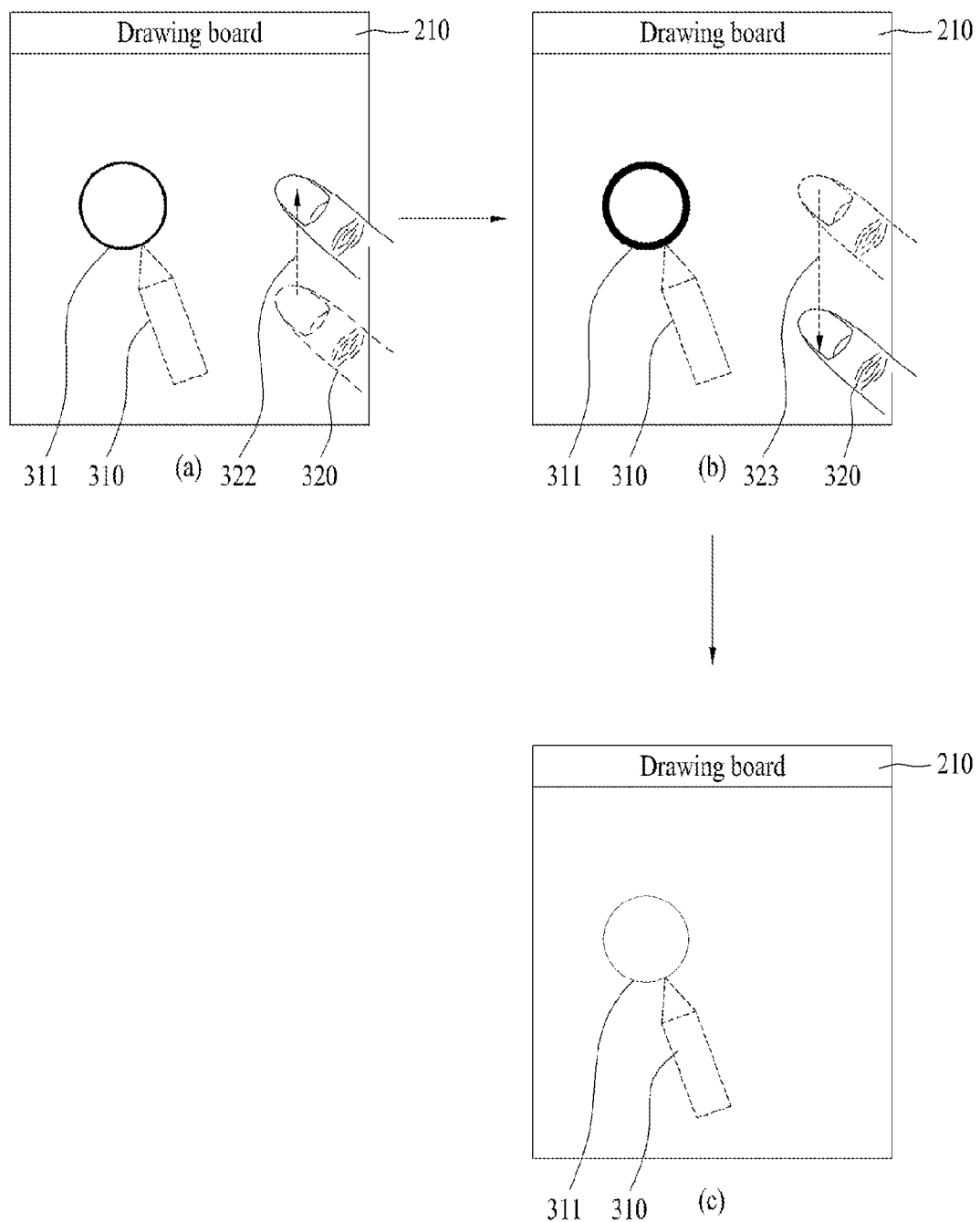

In another example, FIG. 9 shows that a thickness adjustment editing function for the pattern of the first touch gesture is assigned to the second touch gesture. Referring to FIG. 9(*a*), if the first touch gesture and the second touch gesture are discriminated from each other by the process shown in FIG. 3, the controller 180 draws and displays the pattern 311 of the first touch gesture on the drawing board screen 210.

If a pattern of the second touch gesture is the pattern 322, referring to FIG. 9(*a*), the controller 180 increases a thickness of the pattern 311 as shown in FIG. 9(*b*). While the pattern 311 of the first touch gesture is enlarged, if the pattern 322 of the second touch gesture is changed into the pattern 323, the controller 180 decreases a thickness of the pattern 311 of the first touch gesture in response to the pattern 323 as shown in FIGS. 9(*b*) and 9(*c*).

In particular, while the pattern 311 of the first touch gesture is drawn on the drawing board screen 210, if the pattern 322 is input by being dragged in a top direction by a user's hand (e.g., finger, palm, etc.) 320, the controller 180 increases the thickness of the pattern 311 of the first touch gesture in proportion to an extent of the top-directional drag. On the other hand, if the pattern 323 is input by being dragged in bottom direction by the user's hand (e.g., finger, palm, etc.) 320, the controller 180 decreases the thickness of the pattern 311 of the first touch gesture in proportion to an extent of the bottom-directional drag.

Figure 10:
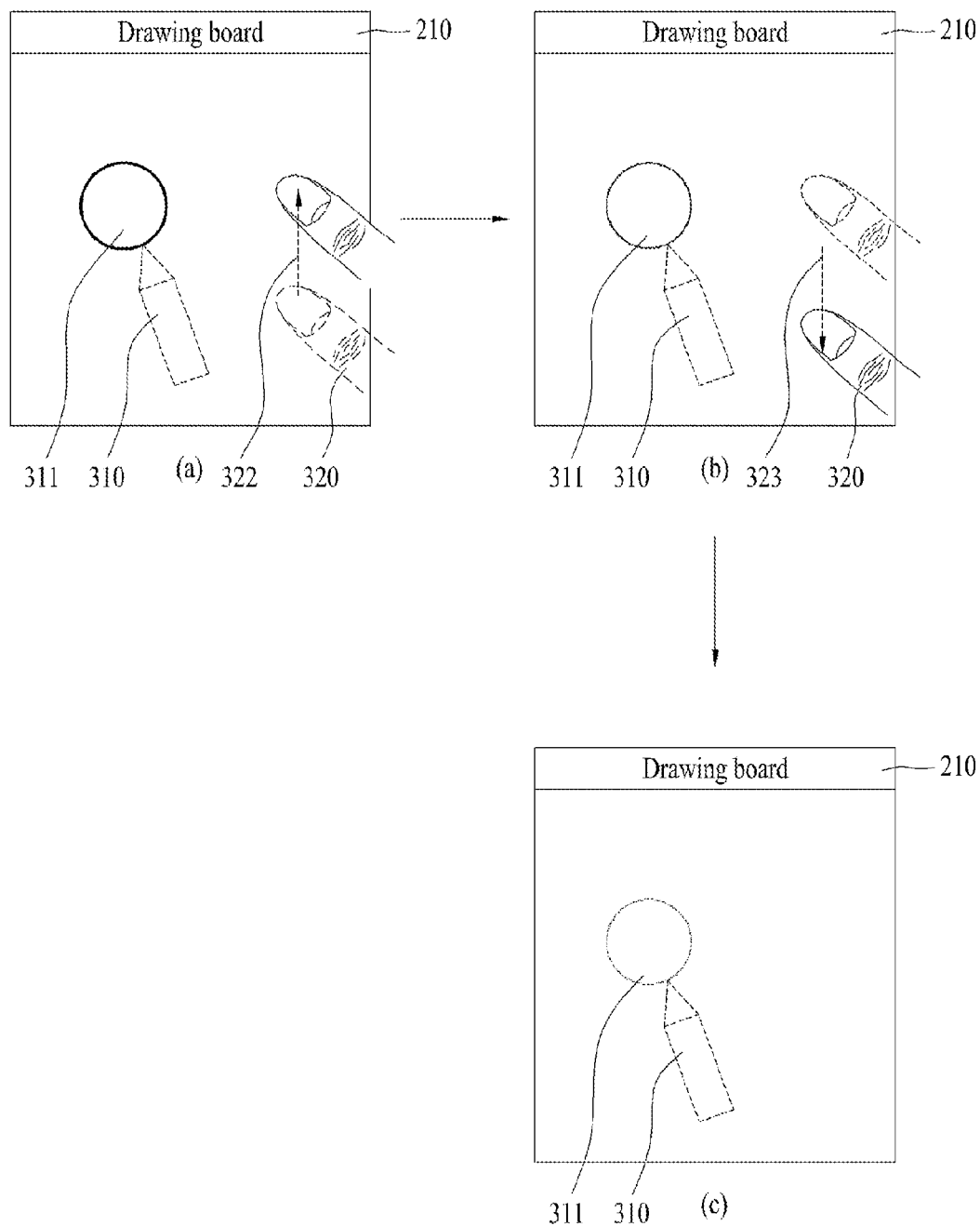

In still another example, FIG. 10 shows that a color change function for the pattern of the first touch gesture is assigned to the second touch gesture. Referring to FIG. 10(*a*), if the first touch gesture and the second touch gesture are discriminated from each other by the process shown in FIG. 3, the controller 180 draws and displays the pattern 311 of the first touch gesture on the drawing board screen 210.

If a pattern of the second touch gesture is the pattern 322, referring to FIG. 10(*a*), the controller 180 changes a color of the pattern 311 into a first color in response to the first pattern 322 as shown in FIGS. 10(*a*) and 10(*b*). While the color of the pattern 311 of the first touch gesture is changed into the first color, if the pattern 322 of the second touch gesture is changed into the pattern 323, the controller 180 changes the first color of the pattern 311 into a second color in response to the pattern 323 as shown in FIGS. 10(*b*) and 10(*c*).

In particular, while the pattern 311 of the first touch gesture is drawn on the drawing board screen 210, if the second touch gesture is gradually dragged in a top direction by a user's hand (e.g., finger, palm, etc.) 320, the controller 180 gradually changes the color of the pattern 311 into other colors. On the other hand, if the second touch gesture is gradually dragged in a bottom direction by the user's hand (e.g., finger, palm, etc.) 320, the controller 180 gradually changes the color of the pattern 311 into other colors in order reverse to that of the top-directional drag.

Figure 11:
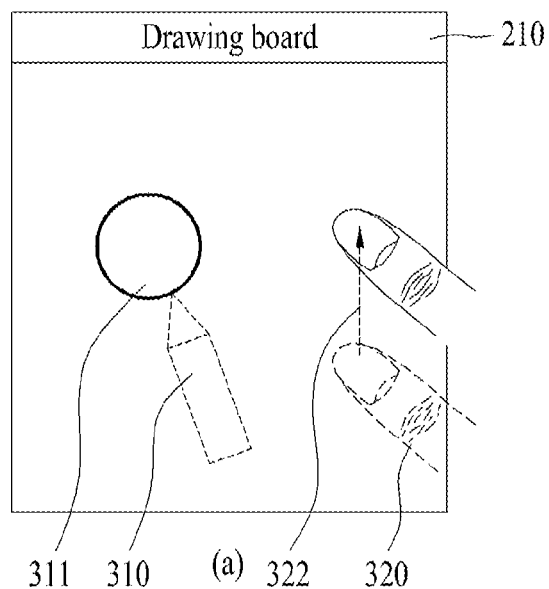
Figure 11:
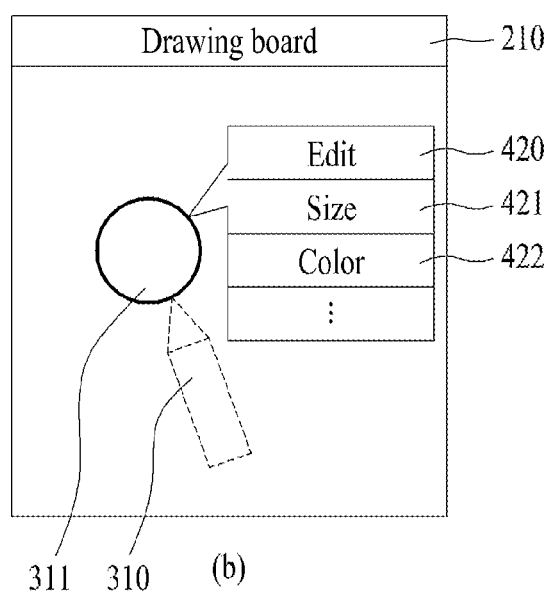

In another example, FIG. 11 shows that an editing menu list providing function for the pattern of the first touch gesture is assigned to the second touch gesture. Referring to FIG. 11(a), if the first touch gesture and the second touch gesture are discriminated from each other by the process shown in FIG. 3, the controller 180 draws and displays the pattern 311 of the first touch gesture on the drawing board screen 210.

Referring to FIG. 11(b), the controller 180 displays a list 420, which includes at least one editing menu for the pattern 311 of the first touch gesture, assigned to the pattern 322 of the second touch gesture. For instance, referring to FIG. 11(b), the list includes a first editing menu 421 for changing a size of the pattern 311 of the first touch gesture and a second editing menu 422 for changing a color of the pattern 311 of the first touch gesture.

Of course, the list 420 may further include a menu for providing an editing function of the pattern 311 of the first touch gesture as thickness change, cutting, copy, removal, move, rotation and the like in addition to the size change and the color change.

If the first editing menu 321 is selected, the controller 180 displays an input window, which is provided to input a changeable size of the pattern 311 of the first touch gesture, on the drawing board screen 210. The controller 180 can then change the size of the pattern 311 of the first touch gesture into a size input via the input window.

If the second editing menu 422 is selected, the controller 180 displays a palette, which contains a multitude of colors for selecting a changeable color of the pattern 311, on the drawing board screen 210 and can then change the color of the pattern of the first touch gesture into the color selected from the palette.

Next, in the following description, the operation C shown in FIG. 3 is explained in detail with reference to FIGS. 12 to 14. In particular, FIG. 12 is a flowchart and FIGS. 13 and 14 are diagrams to describe the operation C shown in FIG. 3.

Figure 12:
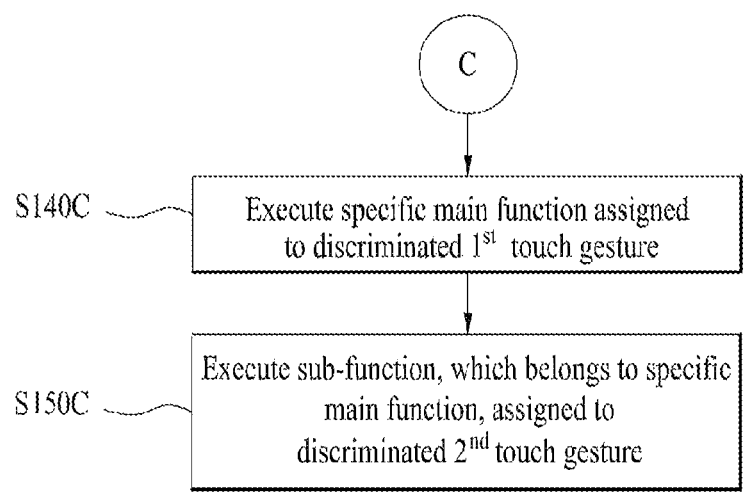
FIG. 12 is a flowchart of an operation C shown in FIG. 3.
Figure 13:
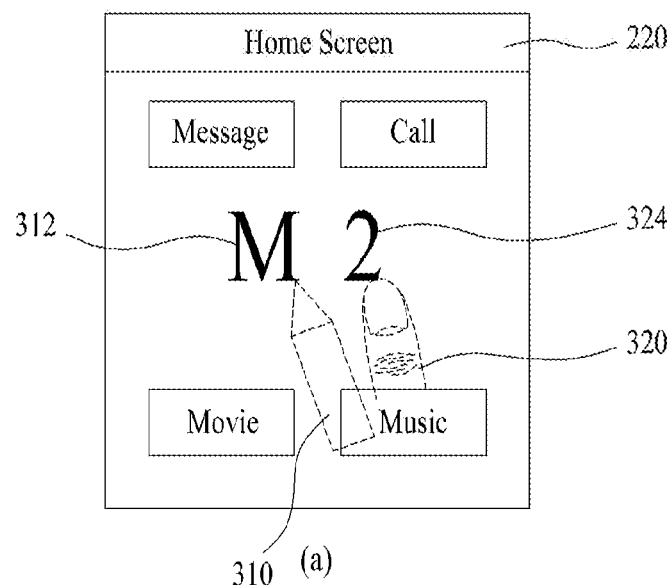
FIG. 13 and FIG. 14 are diagrams to describe an operation C shown in FIG. 3.
Figure 13:
Figure 14:
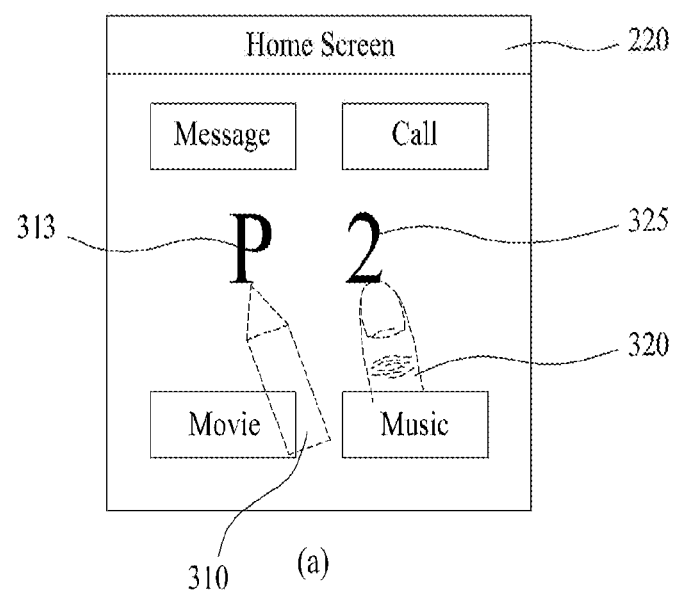
Figure 14:
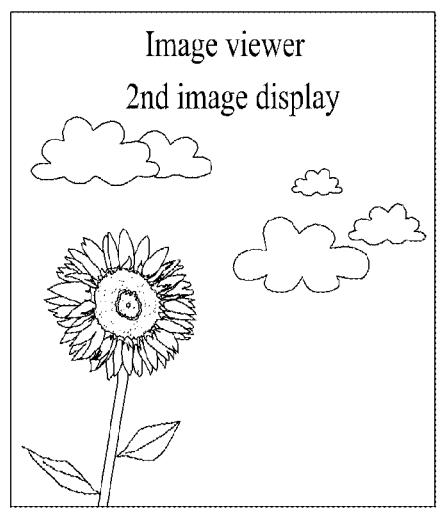

Referring to FIGS. 12 to 14, if a pattern of a first touch gesture having a specific main function assigned thereto by the passive stylus pen 310 and a pattern of a second touch gesture having a sub-function belonging to the main function assigned thereto by a user's hand (e.g., finger, palm, etc.) 320 are input onto a screen of the touchscreen 151, the controller 180 discriminates the pattern of the first touch gesture and the pattern of the second touch gesture from each other based on the discrimination value, executes the main function assigned to the pattern of the first touch gesture (S140C), and also executes the sub-function, which belongs to the main function, assigned to the pattern of the second touch gesture (S150C).

In this instance, the user can set the pattern of the first touch gesture, the pattern of the second touch gesture, the main function assigned to the pattern of the first touch gesture, and the sub-function assigned to the pattern of the second touch gesture.

In particular, if the controller 180 displays a setting window for setting the pattern of the first touch gesture, the pattern of the second touch gesture, a main function for the pattern of the first touch gesture, and a sub-function for the pattern of the second touch gesture, the user can set up the pattern of the first touch gesture, the pattern of the second touch gesture, a desired main function for the pattern of the first touch gesture, and a desired sub-function for the pattern of the second touch gesture via the setting window.

In this instance, the main function may include one of functions provided to the mobile terminal 100. In addition, the sub-function may include one of functions available within the main function.

For instance, FIG. 13 shows that the main function assigned to the pattern of the first touch gesture includes 'music player' and also shows that the sub-function assigned to the pattern of the second touch gesture is 'second music file play'.

In particular, referring to FIG. 13(a), if a pattern 312 of the first touch gesture and a pattern 324 of the second touch gesture are input to a specific screen 220 of the touchscreen, the controller 180 discriminates the first touch gesture and the second touch gesture from each other based on the discrimination value. Referring to FIG. 13(b), the controller 180 executes the music player as the main function assigned to the pattern 312 of the discriminated first touch gesture.

In addition, as the sub-function assigned to the pattern 324 of the second touch gesture, the controller 180 plays a second music file among music files playable via the music player.

On the other hand, referring to FIG. 14(a), if a pattern 313 of the first touch gesture and a pattern 325 of the second touch gesture are input to the specific screen 220 of the touchscreen, the controller 180 discriminates the first touch gesture and the second touch gesture from each other based on the discrimination value. Referring to FIG. 14(b), the controller 180 executes the image viewer as the main function assigned to the pattern 313 of the discriminated first touch gesture.

In addition, as the sub-function assigned to the pattern 325 of the second touch gesture, the controller 180 plays a second image file among image files displayable via the image viewer.

Accordingly, the present invention provides the following advantages. First of all, in a mobile terminal and controlling method thereof according to the present invention, when a touch by a passive stylus pen and a touch by a user's hand (e.g., finger, palm, etc.) are input to a touchscreen in a passive stylus pen use mode, the two touches are discriminated from each other and a user-intended operation corresponding to the touch by the passive stylus pen is discriminatively performed. Therefore, the present invention provides an effect of preventing an operation unintended by a user from being performed due to the touch by the user's hand (e.g., finger, palm, etc.) in the course of using the passive stylus pen.

Secondly, in a mobile terminal and controlling method thereof according to the present invention, when a user draws a pattern using a passive stylus pen in a manner of putting a palm on a touchscreen as if drawing a pattern with a pen by putting the palm on a notebook, the present invention provides an effect that a touch with the passive stylus pen is recognized only for operation.

Effects obtainable from the present invention may be non-limited by the above mentioned effect. And, other unmentioned effects can be clearly understood from the following description by those having ordinary skill in the technical field to which the present invention pertains.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a touchscreen configured to receive an input of a first touch gesture and a second touch gesture;
a memory configured to store a discrimination value for determining if the first or second touch gesture is by a touch pen; and
a controller configured to:
compare an attribute of the first touch gesture and an attribute of the second touch gesture with the discrimination value,
recognize the first touch gesture as being from the touch pen and the second touch gesture as being from a user's hand when the attribute of the first touch gesture is within a range of the discrimination value,
control the touchscreen to display a pattern of the first touch gesture more prominently than a pattern of the second touch gesture by blinking the pattern of the first touch gesture or adjusting a color of the pattern of the first touch gesture, and
execute an operation corresponding to the first touch gesture.

2. The mobile terminal of claim 1, wherein the first and second touch gestures are input to the touchscreen simultaneously or consecutively in a random order.

3. The mobile terminal of claim 1, wherein the touch pen comprises a passive stylus pen.

4. The mobile terminal of claim 1, wherein the discrimination value comprises at least one touch attribute value of a touch gesture previously input by the touch pen.

5. The mobile terminal of claim 1, wherein the discrimination value comprises an average range value of a strength of static electricity generated from a touch gesture previously input by the touch pen, and
wherein the controller is further configured to determine the first touch gesture as being from the touch pen when the first touch gesture has an electrostatic strength belonging to the average range value in the recognized electrostatic strength.

6. The mobile terminal of claim 1, wherein the discrimination value comprises an average range value of a touch area of a touch gesture previously input by the touch pen, and
wherein the controller is further configured to determine the first touch gesture as being from the touch pen when the first touch gesture has a size of the touch area belonging to the average range value in the recognized touch area of the first.

7. The mobile terminal of claim 1, wherein the controller is further configured to recognize pattern change amounts of the first and second touch gestures and determine a touch gesture having a greater change amount in the recognized touch pattern change amounts of the first and second touch gestures as the first touch gesture.

8. The mobile terminal of claim 1, wherein the controller is further configured to recognize per-time touch moving distances of the first and second touch gestures and determine a touch gesture having a greater moving distance in the recognized per-time touch moving distances of the first and second touch gestures as the first touch gesture.

9. The mobile terminal of claim 1, wherein the controller is further configured to ignore the second touch gesture and perform the operation corresponding to the first touch gesture only.

10. The mobile terminal of claim 1, wherein the controller is further configured to display information indicating a portion of the touchscreen except a portion corresponding to the second touch gesture is a region inputtable by the touch pen.

11. The mobile terminal of claim 1, wherein the controller is further configured to maintain the pattern of the first touch gesture and to gradually remove the pattern of the second touch gesture.

12. The mobile terminal of claim 1, wherein the controller is further configured to edit the pattern of the first touch gesture according to the second touch gesture.

13. The mobile terminal of claim 12, wherein the controller is further configured to increase and decrease a size of the pattern of the first touch gesture based on a movement of the second touch gesture.

14. The mobile terminal of claim 12, wherein the controller is further configured to display an editing menu for editing the pattern of the first touch gesture based on the second touch gesture and edit the pattern of the first touch gesture based on selections made in the editing menu.

15. The mobile terminal of claim 1, wherein an execution of a specific main function is assigned to the first touch gesture and a sub-function dependent on the main function is assigned to the second touch gesture, and
wherein the controller is further configured to execute the main function assigned to the first touch gesture and then execute the sub-function assigned to the second touch gesture.

16. A method of controlling a mobile terminal, the method comprising:
receiving, via a touchscreen of the mobile terminal, an input of a first touch gesture and a second touch gesture;
storing, via a memory of the mobile terminal, a discrimination value for determining if the first or second touch gesture is by a touch pen;
comparing, via a controller of the mobile terminal, an attribute of the first touch gesture and an attribute of the second touch gesture with the discrimination value;
recognizing, via the controller, the first touch gesture as being from the touch pen and the second touch gesture as being from a user's hand when the attribute of the first touch gesture is within a range of the discrimination value;
displaying, via the touchscreen, a pattern of the first touch gesture more prominently than a pattern of the second touch gesture by blinking the pattern of the first touch gesture or adjusting a color of the pattern of the first touch gesture; and
executing, via the controller, an operation corresponding to the first touch gesture.

17. The method of claim 16, wherein the first and second touch gestures are input to the touchscreen simultaneously or consecutively in a random order.

* * * * *